J. McDANIEL.
HOSE COUPLING AND CLAMPING DEVICE.
APPLICATION FILED FEB. 28, 1913.
1,066,935.
Patented July 8, 1913.
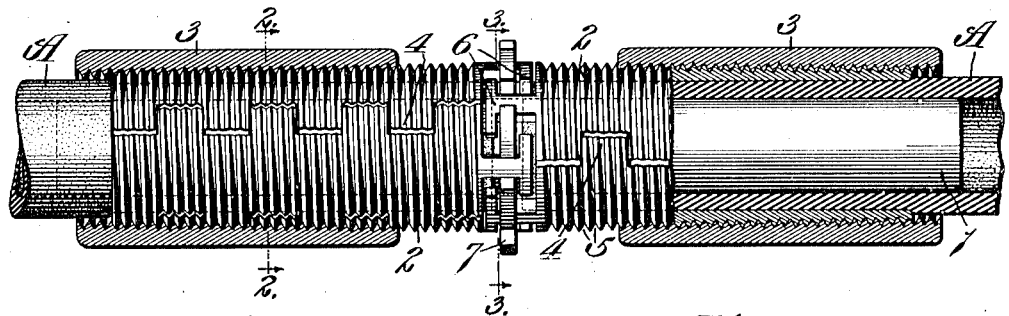
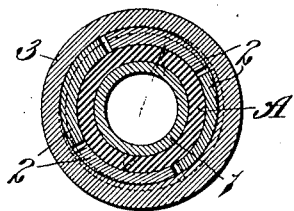
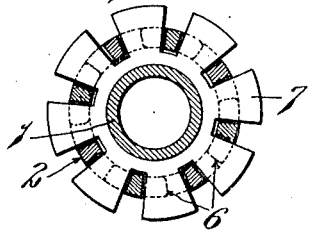
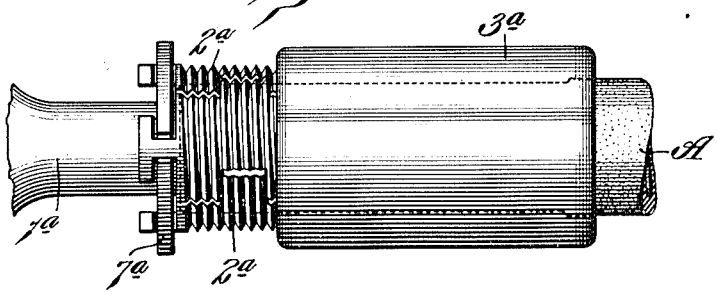
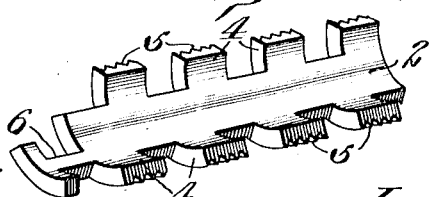

UNITED STATES PATENT OFFICE.

JAMES McDANIEL, OF ST. LOUIS, MISSOURI.

HOSE COUPLING AND CLAMPING DEVICE.

1,066,935.  Specification of Letters Patent.  Patented July 8, 1913.

Application filed February 28, 1913. Serial No. 751,192.

*To all whom it may concern:*

Be it known that I, JAMES MCDANIEL, a citizen of the United States, residing at St. Louis, Missouri, have invented a certain new and useful Improvement in Hose Coupling and Clamping Devices, of which the following is a full, clear, and exact description, such as will enable others skilled in the art to which it appertains to make and use the same.

This invention relates to hose couplings, and has for its main object to provide an efficient means of novel construction for clamping a hose tightly to a coupling nipple or to a device mounted in the end of the hose.

Another object is to provide a hose coupling or clamping device that comprises a sectional hose-clamping means that completely surrounds the hose and whose exterior is screw-threaded, and an adjustable tapered sleeve that is adapted to be screwed onto said clamping means so as to cause the parts or sections of same to clamp the hose tightly to the nipple or member inserted in the end of the hose. And still another object is to provide a hose-coupling or clamping device which is so designed that the natural tendency of the operator to turn or twist the hose with relation to the nipple or object inserted in the end of the hose results in causing the hose to be clamped more tightly to said nipple or object.

Other objects and desirable features of my invention will be hereinafter pointed out.

Figure 1 of the drawings is a view partly in elevation and partly in section of a hose-coupling constructed in accordance with my invention; Fig. 2 is a transverse sectional view taken on the line 2—2 of Fig. 1; Fig. 3 is a transverse sectional view taken on the line 3—3 of Fig. 1; Fig. 4 is a side elevational view of a device embodying my invention for clamping a hose to a nozzle or other object that is inserted in the end of the hose; and Fig. 5 is a perspective view of one part or section of the hose-clamping means of the device.

Referring to Fig. 1 of the drawings which illustrates a device constructed in accordance with my invention for coupling two sections A of hose together, 1 designates a coupling nipple that is inserted in the ends of both sections of hose, 2 designates a plurality of members that form a tubular-shaped clamping means for each section of the hose, and 3 designates sleeves that coöperate with the members 2 to force said members into snug engagement with the sections of the hose and thus cause the hose to be clamped tightly to the coupling nipple 1, it being, of course, understood that the members 2 and sleeve 3 that coöperate with one section of the hose are separate and distinct from the members 2 and sleeve 3 that coöperate with the other section of the hose. As shown in Fig. 5, each of the members 2 consists of a segment of a cylinder, and in the embodiment of my invention herein shown, four of said members are used to form each of the tubular-shaped hose-clamping means of the device. The four members 2 that constitute each of said tubular-shaped clamping means have interlocking teeth or portions 4 that prevent said members 2 from moving longitudinally with relation to each other, but said interlocking teeth 4 are so designed that the members 2 can move radially with relation to the coupling nipple 1 so as to vary the diameter of the tubular-shaped hose-clamping means which the members 2 form. Screw-threads 5 are formed on the exterior of the members 2, and the sleeve 3 that coöperates with each set of members 2 is screw-threaded on its inner side and tapered longitudinally so that the members 2 will clamp the hose tightly upon the coupling nipple 1 when the sleeve 3 is screwed onto the members 2, as shown in Fig. 1, the operation of screwing up the sleeve resulting in a gradual tightening of the members 2, or, in other words, operating to gradually reduce the diameter of the tubular-shaped clamping means formed by the members 2. In order to prevent one set of members 2 from turning when their coöperating sleeve 3 is being screwed onto same, I have provided the members 2 with substantially T-shaped devices 6 that interlock with a disk 7 arranged on the coupling nipple 1 at approximately the center of same, as shown in Figs. 1 and 3.

In assembling the parts of my improved hose-coupling device, the T-shaped parts 6 on the hose-clamping members 2 of one set are arranged in staggered relation with the parts 6 of the hose-clamping members of the other set, as shown in Fig. 1, and the sleeves 3 are thereafter screwed onto the members 2 so as to cause said members to clamp the hose tightly upon the coupling nipple, and in view of the fact that one set of clamping members 2 are interlocked with the other set of clamping members, through means of the disk 7, there is no tendency for one set of clamping members 2 to turn when their coöperating sleeve 3 is being screwed onto same.

In Fig. 4 I have illustrated a device embodying my invention for clamping a hose onto a nozzle or other member $1^a$, said device comprising only one set of segmental-shaped clamping members $2^a$ and a coöperating internally tapered sleeve $3^a$, the disk $7^a$ of said device which is interlocked with the members $2^a$ being grasped by one hand of the operator when his other hand is used to screw up the sleeve $3^a$.

A hose-coupling or clamping device of the construction above-described will bind a hose tightly to a coupling nipple or to an object inserted in the end of the hose owing to the fact that it comprises a tubular-shaped hose-clamping means that completely surrounds the hose and whose inner diameter is reduced gradually during the operation of applying the device. The device can be applied or removed quickly, and as it comprises a rotatable sleeve that is mounted on the end of the hose adjacent the nozzle or nipple inserted in the hose, the natural tendency of the operator is to screw up said sleeve and thus clamp the hose more tightly when the hose is being used. Consequently, my improved device is particularly well-adapted for use on pneumatic hammers and similar tools that require a perfectly tight joint between the hose and the nozzle or nipple of the tool.

Having thus described my invention, what I claim as new and desire to secure by Letters Patent is:

1. A hose coupling device consisting of a coupling nipple that is adapted to project into the adjacent ends of two sections of hose, a hose-clamping means for each section of the hose composed of a set of segmental-shaped clamping members provided on their longitudinal edges with laterally projecting interlocking portions, an internally tapered sleeve coöperating with each set of clamping members and adapted to be screwed onto same so as to force them tightly against the hose, a device loosely mounted on the nipple between the ends of the sections of hose, and portions on both sets of clamping members that interlock with said device so as to prevent one set of clamping members from pulling longitudinally away from the other set.

2. A hose-coupling device, comprising a coupling nipple, a pair of tubular-shaped hose-clamping means, each of which is composed of a set of interlocking segmental-shaped members that completely surround the hose with which they coöperate, an internally tapered sleeve adapted to be screwed onto each set of members so as to force them tightly against the hose, substantially T-shaped devices on the inner ends of said segmental-shaped members, the devices on one set of members being arranged in staggered relation to those on the other set of members, and a disk at approximately the center of the nipple that interlocks with said T-shaped devices.

In testimony whereof I hereunto affix my signature in the presence of two witnesses, this twenty fourth day of February 1913.

JAMES McDANIEL.

Witnesses:
WELLS L. CHURCH,
GEORGE BAKEWELL.